United States Patent Office 3,429,762
Patented Feb. 25, 1969

3,429,762
METHOD FOR PRODUCING LAMINATED PLATES OF PHENOL TYPE RESIN
Takehisa Nakagawa and Rikio Asanuma, Shimodate-shi, Japan, assignors to Hitachi Chemical Company, Ltd., Tokyo, Japan, a corporation of Japan
No Drawing. Filed Jan. 22, 1965, Ser. No. 427,510
Claims priority, application Japan, Jan. 24, 1964, 39/3,162
U.S. Cl. 156—335      9 Claims
Int. Cl. C09j 3/00

ABSTRACT OF THE DISCLOSURE

The present disclosure is directed to a method of producing laminated plates which comprises impregnating base materials for said laminated plates with a first varnish comprising a solution in a water-containing organic solvent of a water-soluble phenol type resin obtained by reacting a phenol group compound a formaldehyde-producing compound in the presence of an alkaline catalyst and a second varnish comprising an aromatic hydrocarbon modified phenol type resin obtained by reacting an aromatic hydrocarbon formaldehyde resin with a phenol group compound, a formaldehyde-producing compound and a vegetable oil having at least one hydrocarbon chain of 15 to 17 carbon atoms in the phenol nucleus, and heating and pressing a number of plates of the impregnated base materials to bond them together.

---

This invention relates to methods for producing laminated plates of phenol type resin which are characterized in heating and pressing the required numbers of sheets of base material for lamination which have been piled up and treated in advance in two steps with a water soluble phenol type resin and an aromatic hydrocarbon modified phenol type resin so as to effect adhesion of the sheets.

Laminated resin plates produced by the impregnation of phenolformaldehyde type resin into cellulosic material, the sheet-forming of the said resin-impregnated cellulosic material, the piling up of sheets into one block, if necessary with metal foils put on them and the heating and pressing with metal foils put on them and the heating and pressing of the piled up sheets for adhesion, have been used as electric insulators and copper-lined laminated base plates for printing circuit after being subjected to machine works such as cutting and hole-boring.

Since boring works are mainly carried out by punching, it frequently happens that the layers of laminated plates are detached or the circumferences of the holes are injured. When laminated resin plates are used as copper-lined laminated base plates for a printing circuit, there is a danger of base plates, i.e. laminated resin plates, being attacked by various solvents such as trichloroethylene, perchloroethylene, aromatic hydrocarbons, alcohols, ketones or corrosive chemicals such as aqueous ferric chloride solution because the chance of contact with such solvents or chemicals is large.

By the remarkable advancement of electronic instruments in recent years, the highest grade of properties e.g. such electric properties as tan δ, dielectric constant, electric insulation, resistance to moisture as well as their reliability are now being required in the electric insulation materials used for such purpose.

There have been proposed conventionally various laminated resin plates such as those using polyester-modified phenol resins, isopropylphenol-modified phenol resins, modified with a nitrile rubber comprising a copolymer of butadiene and acrylonitrile, tung oil-modified phenol resins, cashew nut oil-modified phenol resins, and phenol resins modified with the reaction product of styrene and phenol. However there have been found none which satisfies, simultaneously, the workability of punching, the resistance to solvents and chemicals, electrical properties and the resistance to water and moisture.

As for methods for improving electrical properties, resistance to water and moisture of laminated plates of a phenol type resin, there has been proposed a method which is characterized by impregnating lamination base materials with resins obtained by the condensation of an aromatic hydrocarbon formaldehyde resin and a member selected from the group consisting of a phenol group compound and a phenol formaldehyde resin, followed by resolification with formaldehyde in the presence of an alkaline catalyst and pressing the required numbers of impregnated sheets.

It has been confirmed that the laminated plates of phenol type resin produced by this method have high electric insulation resistance, are superior in the tan δ, dielectric constant, resistance to water and moisture because their resin has a low content of phenolic hydroxy radical.

However, such laminated plates are too hard and too brittle to bring about a good result by mechanical works such as punching, shearing and drilling. Especially when punching is carried out at room temperature, the detachment of layers of laminated plates and the injury to the circumference parts around holes are introduced. It has been accordingly, hard to obtain laminated resin plates having characteristic properties satisfactory for practical use.

An object of the present invention is to provide laminated resin plates superior in workability with machines, electric characteristic properties, and resistance to solvents, water and moisture.

Another object of the present invention is to provide laminated plates of resins relatively inexpensive in production cost.

A further object of the present invention is to provide methods for producing the above-mentioned laminated resin plates.

Still further objects and advantage of the present invention will be apparent from the description that follows.

The present invention consists of a first varnish treatment step, i.e. the impregnation of lamination base materials with a water soluble phenol type resin dissolved in a water-containing organic solvent obtained by heating and reacting a phenol group compound and formaldehyde in the presence of an alkaline catalyst, and the second varnish treatment step, i.e. the impregnation of the above-mentioned varnish treated base materials with an aromatic hydrocarbon-modified phenol type resin obtained by modifying an aromatic hydrocarbon formaldehyde resin with a phenol group compound, a formaldehyde group compound and a vegetable oil having at least one hydrocarbon chain consisting of 15 to 17 carbon atoms in the phenol nucleus, followed by heating and pressing a required numbers of sheets of the base materials treated in the foregoing manner to effect adhesion.

We have found that the laminated resin plates produced by the use of an aromatic hydrocarbon formaldehyde resin modified with cashew nut oil, urushiol or their related compound, a phenol group compound and a formaldehyde possess excellent workability for machine works. However we have also found that cashew nut oil, urushiol or their related compounds have long hydrocarbon side chain in the phenol nucleus, and thus the resins modified with these vegetable oils have a poor affinity to lamination base materials e.g. paper, and as a consequence of this exerts an adverse effect upon the water resistance of laminated plates, thereby substantially reducing the electric characteristic properties, after absorption, of water and moisture.

Advancing the investigation further, we have solved the above-mentioned problem by impregnating a water-soluble phenol-type resin into lamination base materials, drying the impregnated base materials, further impregnating an aromatic hydrocarbon formaldehyde resin and with a vegetable oil-modified phenol-formaldehyde resin into above-mentioned base materials, drying the impregnated base materials again and heating and pressing the required numbers of piled up resin impregnated materials so as to effect adhesion of the sheets.

The water soluble phenol type resins useful in the present invention are those obtained by the reaction of a phenol group compound and a formaldehyde group compound in the presence of alkaline catalyst. They are resins capable of using water as one constituent of the solvent. Suitable resins include for example, those which are obtained by reacting phenol, cresol, xylenol or a mixture of more than two kinds of the foregoing members with formaldehyde in the presence of an alkaline catalyst such as sodium hydroxide, potassium hydroxide, barium hydroxide, or a tertiary amine such as trimethyl amine, triethyl amine, or dimethyl aniline.

The reason of limiting the above-mentioned phenol-type resins to only those capable of using water as one constituent of the solvent, is due to the fact that the water resistance of laminated resin plates is improved by sufficiently permeating the resin between fibers of base materials and the permeation of resin is exceedingly enhanced by allowing the said base materials to swell with water. As a solvent, it is preferable to use an organic solvent containing more than 20 wt. percent of water. The effect of water does not appear when its content is lower than 20 wt. percent.

The aromatic hydrocarbon modified phenol-type resins useful in the present invention are those aromatic hydrocarbon formaldehyde resins which are modified with a phenol group compound, a formaldehyde group compound and a vegetable oil possessing at least one hydrocarbon chain of 15 to 17 carbon atoms in the phenol nucleus. Such vegetable oils include cashew nut oil, urushiol and their related oil.

The cashew nut oils are contained in the outer shell of the nut of a kind of tropical plant cashew nut tree (*Anacardium occidentale* L.). A single constituent which is separated by distillation or extraction of the principal constituents of cashew nut oils, cardanol, anacardol cardol and the like or a single constituent in which parts of other constituents are mixed, is useful.

The cashew nut oil has the following compositions:

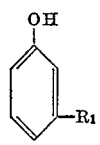

$R_1$: —$(CH_2)_7$—CH=CH—$(CH_2)_5$—$CH_3$
—$(CH_2)_7$—CH=CH—$CH_2$
  —CH=CH—$(CH_2)_2$·$CH_3$
—$(CH_2)_7$—CH=CH—$CH_2$—CH=CH
  —$CH_2$—CH=$CH_2$
—$(CH_2)_{14}$—$CH_3$

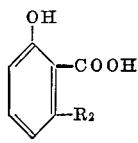

$R_2$: —$CH_2$—$(CH_2)_6$CH=CH—$(CH_2)_5$—$CH_3$
—$CH_2(CH_2)_6$CH=$CH_2$
  —CH=CH—$(CH_2)_2$—$CH_3$
—$CH_2$—$(CH_2)_6$CH=CH—$CH_2$
  —CH=CH—$CH_2$—CH=$CH_2$
—$(CH_2)_{14}$—$CH_3$

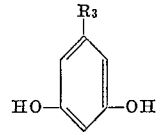

$R_3$: —$CH_2(CH_2)_6$—CH=CH—$CH_2$
  —CH=CH$(CH_2)_2$—$CH_3$

The urushiols are collected from urushi tree (*Anacardium occidental* L.) and have an unsaturated hydrocarbon chain of 15 carbon atoms on the 3rd position of catechol. Another urushiols laccol having an unsaturated hydrocarbon chain of 17 carbon atoms in the 3rd position of catechol and thistiol having an unsaturated hydrocarbon chain of 17 carbon atoms on the 4th position of catechol are also useful as a single constituent or a mixture of constituents.

The chemical formulas of above-mentioned urushiols are as follows:

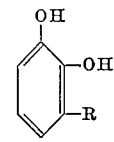

—$(CH_2)_{14}$·$CH_3$ (hydrourushiol)
—$(CH_2)_7$CH=CH—$(CH_2)_5$—$CH_3$
—$(CH_2)_7$CH=CH—$(CH_2)_4$—CH=$CH_2$
—$(CH_2)_7$CH=CH—$CH_2$—CH=CH—CH=CH—$CH_3$
—$(CH_2)_7$CH=CH—$CH_2$—CH=CH—$CH_2$—CH=$CH_2$

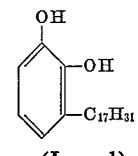

(Laccol)

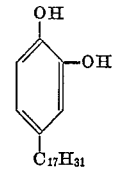

(Thistiol)

In the present invention cashew nut oils or urushiols are used alone or as a mixture. The compounds obtained by hydrogenating the unsaturated hydrocarbon of the side chain of the above-mentioned cashew nut oils and urushiols are also useful.

Phenol group compounds include phenol, cresol, xylenol, isopropyl phenol, tertiary butyl phenol, octylphenol, nonylphenol, bisphenol A, and phenylphenol. Substituted phenols include ortho, meta and para substituents.

Formaldehyde group compounds include formaline, paraformaldehyde and aqueous solutions of said compounds.

The aromatic hydrocarbon formaldehyde resins modified by the above-mentioned three kinds of compounds are those obtained by subjecting a single compound of for example benzene, toluene, orthoxylene, metaxylene, paraxylene, mixed xylene, mesitylene, naphthalene, or alkyl-substituted aromatic hydrocarbons or a mixture selected from said group of aromatic hydrocarbons, and a formaldehyde group compound to copoly-condensation in the presence of an acidic catalyst e.g. concentrated sulfuric acid, phosphoric acid, hydrochloric acid, formic acid, acetic acid, oxalic acid, aluminum chloride or zinc chloride. The production of this reaction contains 5 to 20 weight percent oxygen rich in reactivity due to the methylol radical, ether bond and acetal bond and possess a molecular weight of about 200 to 1000. Examples of methods for producing aromatic hydrocarbon-modified phenol-type resins useful in the present invention will be given as follows.

Production method 1.—A method consisting of heating an aromatic hydrocarbon formaldehyde resin and a phenol group compound in the presence of acidic catalyst to effect a condensation reaciton and subsequently subjecting the reaction product together with a vegetable oil and a formaldehyde group compound to copolycondensation in the presence of an alkaline catalyst.

Production method 2.—A method consisting of allowing an aromatic hydrocarbon formaldehyde resin and a vegetable oil to react in the presence of an acidic catalyst and then subjecting the reaction product together with a phenol group compound and a formaldehyde group compound to copolycondensation in the presence of an alkaline catalyst.

Production method 3.—A method consisting of allowing an aromatic hydrocarbon formaldehyde resin and a phenol group compound to react in the presence of an acidic catalyst, turning the reaction product to a resol with a formaldehyde group compound in the presence of alkaline catalyst and subjecting the resulting resol together with a member selected from the following groups (1) to (4) to copolycondensation.

(1) A vegetable oil.
(2) A mixture of a vegetable oil and a phenol-group compound.
(3) A reaction product between a vegetable oil and a formaldehyde.
(4) A reaction product obtained by heating and reacting a vegetable oil, a phenol-group compound and a formaldehyde group compound.

Production method 4.—A method consisting of reacting an aromatic hydrocarbon formaldehyde resin and a vegetable oil in the presence of an acidic catalyst, returning the resulting reaction product to a resol in the presence of alkaline catalyst with a formaldehyde group compound and subjecting the resulting product to copolycondensation with a member selected from the following compounds (1) to (4).

(1) Phenol group compound.
(2) A mixture of a phenol group compound and a vegetable oil.
(3) A reaction product of a phenol group compound an a formaldehyde group compound.
(4) A reaction product obtained by heating and reacting a phenol group compound, a vegetable oil and a formaldehyde group compound.

Production method 5.—A method consisting of reacting an aromatic hydrocarbon formaldehyde resin and a phenol group compound in the presence of an acidic catalyst and subjecting the reaction product to copolycondensation with a substance selected from following compounds (1) to (2).

(1) A reaction product of vegetable oil and formaldehyde group compound.
(2) A reaction product obtained by reacting a mixture of a vegetable oil, phenol group compound and a formaldehyde group compound.

Production mtehod 6.—A method consisting of reacting an aromatic hydrocarbon formaldehyde resin and a vegetable oil in the presence of an acidic catalyst and subjecting the reaction product to copolycondensation with a substance selected from following compounds (1) to (2).

(1) A reaction product of phenol group compound and formaldeyde group compound.
(2) A reaction product obtained by reacting a mixture of phenol-group compound, a vegetable oil and a formaldehyde group compound.

Production method 7.—A method consisting of reacting in the presence of an acidic catalyst, aromatic hydrocarbon formaldehyde resin with the condensation product of a phenol group compound and a formaldehyde group compound and subjecting the resulting reaction product and a substance selected from the following compounds (1) and (2) to copolycondensation with formaldehyde or with compound (3).

(1) A vegetable oil.
(2) A vegetable oil and a phenol group compound.
(3) A reaction product of above-mentioned compounds (1) or (2) and a formaldehyde group compound.

Production method 8.—A method consisting of reacting in the presence of an acidic catalyst, an aromatic hydrocarbon formaldehyde resin with a condensation product of a vegetable oil and formaldehyde and subjecting the resulting product and following compounds (1) or (2) to copolycondensation with formaldehyde or with a compound (3).

(1) A phenol group compound.
(2) A vegetable oil and a phenol group compound.
(3) A reaction product of the above-mentioioned compound (1) and (2) and formaldehyde or its related compounds.

Production method 9.—A method consisting of reacting in the presence of an acidic catalyst, an aromatic hydrocarbon formaldehyde resin, a phenol group compound and a vegetable oil, and subjecting the resulting reaction product and a member selected from the following compounds (1) to (3) with formaldehyde to copolycondensation or with a member selected from the compounds (4) and (5).

(1) A phenol group compound.
(2) A vegetable oil.
(3) A phenol group compound and a vegetable oil.
(4) A reaction product of a member selected from the above-mentioned compounds (1) to (3) with a formaldehyde group compound.
(5) A formaldehyde group compound.

Production method 10.—A method consisting of reacting, in the presence of an acidic catalyst, an aromatic hydrocarbon formaldehyde resin and a condensation product of a phenol group compound, vegetable oil and a formaldehyde or its related compounds and subjecting the reaction product to copolycondensation with a following compound (1), (2) or (3) and formaldehyde or with a compound (4) and (5).

(1) A vegetable oil.
(2) A phenol group compound and a vegetable oil.
(3) A phenol group compound.
(4) A reaction product of above-mentioned (1), (2) or (3) and a formaldehyde group compound.
(5) A formaldehyde group compound.

Note: In the above-mentioned methods, the compounds (3) and (4) in the production method 3, the compounds (3) and (4) in the production method 4, the compounds (1) and (2) in the production method 5, the compounds (1) and (2) in the production method 6, the phenol formaldehyde condensation products and the compounds (3) in method 7, the condensation product of a vegetable oil and formaldehyde, and the compounds (3) in method 8, the compounds (4) in method 9 and the condensation product of a phenol group compound, a vegetable oil and a formaldehyde, and the compounds (4) in method 10 are all products which may be obtained by the reaction in the presence of an acidic catalyst, or an alkaline catalyst or in the absence of a catalyst.

As the acidic catalyst used in the condensation of aromatic hydrocarbon formaldehyde resins with a phenol group compound, a vegetable oil, a mixture of a phenol group compound and a vegetable oil, a condensation product of a phenol group compound and a formaldehyde group compound, a condensation product of a vegetable oil and a formaldehyde group compound and in the condensation of a phenol group compound, a vegetable oil and a formaldehyde group compound, an organic acid such as maleic anhydride, phthalic anhydride, benzene sulfonic acid, toluene sulfonic acid, xylene sulfonic acid is in general useful.

In order to make above-mentioned aromatic hydrocarbon-modified phenol type resins curable, they are converted into resols in the last step of resin preparation in the presence of an alkaline catalyst, with the use of a formaldehyde group compound or by the addition of hexamethylene tetramine or the like.

The various characteristic properties of aromatic hydrocarbon-modified phenol type resins vary considerably according to the mixing ratio of their constituents, that is, the aromatic hydrocarbon formaldehyde resin, the vegetable oil and the phenol group compound.

For example, let us take the sum of three constituents, the aromatic hydrocarbon formaldehyde resin, the vegetable oil and the phenol group compound as 100 weight percent, then if the amount of the phenol group compound used is higher than 75 weight percent per total, the workability for machine works, electric characteristic properties, and water resistance of laminated resin plates produced by the resulting aromatic hydrocarbon-modified phenol-type resin are deteriorated. If the amount of the phenol group compound used is lower than 10 weight percent, the curability of the resulting resins deteriorates and is no more suitable as resins for laminated plates.

When the amount of vegetable oil used is higher than 80 weight percent, the resistance to solvent of the resulting resin is poor, the curability is deteriorated and furthermore, the bending strength of the objective laminated resin plates is exceedingly reduced. On the contrary, when the amount is lower than 20 weight percent the resin becomes too hard and too brittle and the workability of the objective laminated resin plates is deteriorated.

When the amount of aromatic hydrocarbon formaldehyde resin used is higher than 70 weight percent and the condensation product of the phenol group compound having more than 3 functional groups and the formaldehyde group compound is used, there is a danger of gelatination occurring during the step of copolycondensation. Even when the gelatination does not occur the adhesive power of each layer of the objective laminated resin plates produced from resulting resin is so weak that defects, e.g. detachment of layers during punching appear. Furthermore of the resistance to solvent is reduced. When the amount is lower than 5 weight percent, not only the electric characteristics such as insulation characteristics, dielectric constant, tan $\delta$, but also other various properties such as resistances to water and to moisture are reduced.

As apparent from the foregoing description, the mixing ratio of these three constituents is preferable to be selected so as to fall in the ranges of aromatic hydrocarbon formaldehyde resin of 5 to 70 weight percent, phenol group compound of 10 to 75 weight percent and vegetable oil of 20 to 80 weight percent, based upon the 100 weight percent of these three kinds of compounds.

The formaldehyde used in the present invention to allow to react with the above-mentioned three constituents may, depending upon its amount, dominate the production amount and properties of the modified phenol type resin. Accordingly, the amount to be used should be selected properly. As in the case of the production method of general phenol resins for lamination, the amount of about 0.8 to 2.0 mols per 1 mol of phenol group compound plus vegetable oil is suitable.

As for the proportions of water soluble phenol type resin (the first treatment varnish) and aromatic hydrocarbon modified phenol type resin (the second treatment varnish) to be impregnated to base materials of laminated plates, 5 to 20 weight percent of the former and 25 to 60 weight percent of the latter, based upon the total weight are particularly preferable.

When the amount of water-soluble phenol type resin is lower than 5 weight percent, various characteristic properties of objective laminated resin plates e.g. water absorption rate, dielectric constant and tan $\delta$ after water absorption, volume resistivity and surface resistivity after moisture absorption are reduced. When it is higher than 20 weight percent, workability of punching, dielectric constant and tan $\delta$ at a normal state are reduced.

On the other hand, when the amount of aromatic hydrocarbon modified phenol type resin is lower than 25 weight percent, electric characteristic properties at normal state, e.g. dielectric constant, tan $\delta$ and workability of punching are reduced, and when it is higher than 60 weight percent, the lamination operation becomes difficult and the bending strength is simultaneously reduced.

Following examples and controls are given to illustrate the present invention, but it goes without saying that they are not intended to limit the scope of the present invention.

EXAMPLE 1

A mixture of 94 g. of phenol, 162 g. of 37 percent formaline and 10 g. of 30 percent trimethyl amine aqueous solution was allowed to react at 70° C. for 3 hours. Then the reaction product was diluted with water and made into a phenol resin varnish containing 12 weight percent resin.

Sheets of cotton linter paper having 10 mils thickness were impregnated with the above-mentioned varnish and dried (the first varnish treatment) to obtain a resin impregnated paper containing 13 to 16 weight percent resin.

The other side, 100 g. of toluene formaldehyde resin (mean molecular weight 380, oxygen content 9.3 weight percent) and 250 g. cardanol were heated and reacted in the presence of 0.5 paratoluene sulfonic acid, at 120° to 130° C. while being dehydrated for 3 hours. Then 300 g. of the reaction product, 100 g. of phenol, 100 g. of paraformaldehyde were heated and reacted in the presence of 14 g. of 28 percent aqueous ammonia and in methanol at 85° C. for 5 hours. The resulting reaction product was heated and concentrated at 80° to 90° C. under a reduced pressure, and dissolved in a 1:1 (by weight) mixed solvent ratio of methanol and toluol to make an aromatic hydrocarbon modified phenol resin varnish containing 45 weight percent resin. The above-mentioned resin impregnated sheets of cotton linter were impregnated with this varnish and dried (the second varnish treatment) and made into a resin impregnated paper containing 55 to 63 weight percent of the total resin.

Eight sheets of resin impregnated paper thus obtained were piled up, and heated, pressed and adhered at 150° to 165° C. under a pressure of 50 to 130 kg./cm.² for 0.5 to 1 hour to obtain the objective laminated plates having 1.6 mm. thickness.

EXAMPLE 2

Sheets of cotton linter paper were impregnated with the phenol resin prepared according to Example 1 and dried to make into resin impregnated paper containing 13 to 16 weight percent of resin.

The other side 100 g. of xylene formaldehyde resin (mean molecular weight 450, oxygen content 11 weight percent), 250 g. of cardanol were heated and reacted in the presence of 0.5 g. of paratoluene sulfonic acid, at 120° to 130° C. for 2.5 hours while being dehydrated. Subsequently 300 g. of the above-mentioned reaction product, 100 g. of phenol, and 100 g. of paraformaldehyde were heated and reacted in the presence of 14 g. of 28 percent aqueous ammonia and in methanol at 85° C. for 5 hours. The reaction product was concentrated and dissolved in 1:1 (by weight) methanol and toluene mixed solvent ratio and made into aromatic hydrocarbon modified phenol resin varnish containing 45 weight percent of resin.

The first varnish treated cotton linter papers were impregnated with this varnish, dried and made into resin impregnated papers containing 60 weight percent of total resin.

Eight sheets of above-mentioned resin treated paper were piled up to produce the objective laminated plates having 1.6 mm. thickness.

EXAMPLE 3

By the same treatment as in Example 1, sheets of cotton linter paper having been treated in the first varnish treatment were prepared.

The other side 90 g. of alkylbenzene resin (mean molecular weight 340, oxygen content 12 weight percent), and 140 g. of mixed cresol (containing 45 weight percent meta cresol) were heated in the presence of 0.1 g. of para-toluene sulfonic acid at 90° C. to 110° C. and reacted for 3 hours while being dehydrated.

Subsequently 100 g. of the reaction product, 220 g. of cardonal and 100 g. of paraformaldehyde were heated and reacted for 5 hours in methanol in the presence of 14 g. of 28 percent aqueous ammonia at 85° C. The reaction product was heated and concentrated under a reduced pressure at 80° to 90° C. and dissolved in a 1:1 (by weight) methanol and toluol mixed solvent ratio and made into aromatic hydrocarbon modified phenol resin varnish containing 43 weight percent of resin.

The cotton linter paper treated in the first varnish treatment were impregnated with this resin varnish and dried to produce resin impregnated paper containing 60 weight percent of resin.

With the use of the above-mentioned resin impregnated sheets of paper, laminated resin plates having 1.6 mm. thickness were obtained by the same procedure as in Example 1.

EXAMPLE 4

By the same procedure as in Example 1, sheets of cotton linter paper impregnated with phenol resin were prepared (paper treated in the first varnish treatment).

The same 100 g. of alkylbenzene as in Example 3, and a 100 g. phenol were heated and reacted for 3 hours in the presence of 0.1 g. of paratoluene sulfonic acid at 100° to 102° C. Then 7 g. of 28 percent aqueous ammonia and 50 g. of paraformaldehyde were added to the reaction product and reaction was conducted product was obtained after the reaction at 80° to 85° C. for 4 hours (A).

Besides this, 300 g. of cashew nut oil, 100 g. of phenol and 75 g. of paraformaldehyde were heated and reacted for 8 hours in the presence of 12 g. of 28 percent aqueous ammonia at 90° to 95° C. to produce reaction product (B).

The total amounts of reaction products (A) and (B) were mixed well, heated and concentrated under a reduced pressure at 90° to 95° C. A mixed solvent of toluene and methanol in the same amount as the total amount of A and B was added to the resulting concentrated mixture for the purpose of dilution and made into aromatic hydrocarbon modified phenol resin varnish containing 48 weight percent of resin.

The above-mentioned resin impregnated sheets of cotton linter paper were impregnated with this resin varnish and dried to obtain laminated resin plates having 1.6 mm. thickness and 60 weight percent of resin content.

EXAMPLE 5

The first varnish treatment was applied to sheets of cotton linter paper having 10 mils thickness by the same procedure as in Example 1 to produce sheets of paper impregnated with a phenol resin.

The other side 300 g. of xylene formaldehyde resin (mean molecular weight 450, oxygen content 11 weight percent) and 210 g. of phenol were heated and reacted for 3 hours in the presence of 0.4 g. of benzene sulfonic acid at 100° to 120° C.

Subsequently 190 g. of Bisphenol A, 1300 g. of cardanol and 730 g. of 37 percent formalin were added to the above-mentioned reaction product and heated and reacted for 8 hours in the presence of 45 g. of 28 percent aqueous ammonia at 95° to 100° C. The reaction product was cooled to room temperature. After liberated water was eliminated, the reaction product was concentrated under a reduced pressure while being heated at 80° to 85° C. A 1:1 (by weight) mixed solvent of methanol and toluene was added to the concentrated product in the same amount of said concentrated product whereby modified phenol resin varnish containing 44 weight percent of resin was obtained.

The above-mentioned resin impregnated sheets of cotton linter paper were further impregnated with this resin varnish and made into resin impregnated sheets of paper containing 63 weight percent of total resin.

Eight sheets of the resin impregnated paper were piled up and by the same procedure as in Example 1 the objective laminated resin plates were obtained.

With the use of these laminated resin plates, upon which 35$\mu$ copper foils with adhesive agent were piled up, coper-foil-pasted laminated plates having 1.7 mm. thickness were obtained by heating and pressing at the conditions of 160° to 165° C., and 90 kg./cm.$^2$.

Control 1.—One hundred grams of alkylbenzene, 140 g. of phenol and 0.1 g. of paratoluene sulfonic acid were heated and reacted for 3 hours at 100° to 110° C. while being dehydrated. Two hundred grams of the reaction product and 60 g. of paraformaldehyde were heated and reacted for 5 hours in the presence of 4.5 g. of 28 percent aqueous ammonia and in methanol at 80° to 85° C. The reaction product was heated and concentrated under a reduced pressure at 85° to 95° C. and then aromatic hydrocarbon modified phenol resin varnish containing 55 weight percent of resin was prepared after the addition of methanol.

The above-mentioned resin varnish was impregnated into sheets of cotton-linter paper of 10 mils thickness which had been subjected to the first step varnish treatment by the same procedure as in Example 1, dried and made into resin impregnated sheets of paper containing 60 weight percent of the resin. Eight sheets of such paper were piled up and heated and pressed at the same lamination conditions as in Example 1 to produce laminated resin plates having 1.6 mm. thickness.

Control 2.—One hundred grams of alkylbenzene resin, 140 g. of phenol and 0.1 g. of paratoluene sulfonic acid were heated and reacted for 3 hours at 100° to 110° C. while being dehydrated. Two hundred grams of the reaction product, 1400 g. of phenol, 400 g. of cashew nut oil and 710 g. of 80 percent paraformaldehyde were heated and reacted for 3 hours in the presence of 40 g. of 28 percent aqueous ammonia and in methanol at 90° to 95° C. Then the reaction product was heated and concentrated under a reduced pressure at 80° to 85° C. and diluted with a 1:1 (by weight) mixed solvent of methanol and toluene to obtain a resin varnish containing 55 weight percent of resin.

After this resin varnish was impregnated into cotton linter paper of 10 mils thickness and dried, laminated plates having thickness of 1.6 mm. were obtained by being heated and pressed at the same lamination conditions as in Example 1.

Control 3.—Four hundred grams of xylene formaldehyde resin (mean molecular weight 450, oxygene content 11 weight percent), 100 g. of phenol, and 0.4 g. of paratoluene sulfonic acid were heated and reacted in 200 g. of toluol at 95° to 110° C. for 3 hours. Then 20 g. of cashew nut oil, 70 g. of 80 percent paraformaldehyde and 5 g. of 28 percent aqueous ammonia were added to the reaction product and reacted at 85° to 90° C. for 5 hours. After the completion of reaction, the reaction product was heated and concentrated under a reduced pressure at 95° to 100° C. and made into resin varnish containing 45 weight percent of resin by being dissolved in a 1:1 (by weight) mixed solvent of methanol and toluene.

With the use of resulting aromatic hydrocarbon modified phenol resin, laminated resin plates having thickness of 1.5 mm. were obtained by the same procedure as in Example 1.

Control 4.—The aromatic hydrocarbon modified phenol resin varnish (the varnish for the second treatment in this invention) was impregnated into cotton linter papers of 10 mil thickness and dried, wherein resin impregnated base materials for lamination containing 53 weight percent resin was obtained. Eight sheets were piled up and using the same lamination conditions as in Example 1, laminated resin plates of 1.6 mm. thickness were obtained. Various characteristic properties of laminated resin plates obtained in Examples 1 to 5 and Controls 1 to 4 are indicated in following table.

Symbols in the table have the following meaning: A—At normal state; B—After the immersion in distilled water at 23° C. for 24 hours; C—After the immersion in boiling distilled water for 2 hours; D—After the heating at 105° C. for 1 hour in air and following immersion in distilled water at 23° C. for 24 hours.

of a phenol group compound with a compound capable of producing formaldehyde, the sum of the aromatic hydrocarbon formaldehyde resin, vegetable oil and phenol group compound being 100 weight percent.

5. A method according to claim 1 wherein the proportions of water soluble phenol type resin and aromatic hydrocarbon modified phenol type resin to the total weight of the laminated plates and the resins included in the plates are 5 to 20 weight percent and 25 to 60 percent respectively.

6. The method of claim 1, wherein the water-soluble phenol type resin used in the first varnish is produced by reacting a member selected from the group consisting of phenol, cresol, xylenol and mixtures thereof, with formaldehyde.

7. The method of claim 1, wherein the phenol group compound used in the second varnish is at least one member selected from the group consisting of phenol, cresol, xylenol, isopropyl phenol, tertiary butyl phenol, octylphenol, nonylphenol, bisphenol A, phenylphenol and ortho, meta and para substituted phenols.

8. The method of claim 1, wherein the formaldehyde-producing compound is selected from the group consisting

| Item | Specimen | Example | | | | | Control | | | |
|---|---|---|---|---|---|---|---|---|---|---|
| | | 1 | 2 | 3 | 4 | 5 | 1 | 2 | 3 | 4 |
| Tan δ (1 mc./s.) | A | 0.031 | 0.031 | 0.029 | 0.030 | 0.032 | 0.028 | 0.058 | 0.029 | 0.033 |
| | B | 0.032 | 0.032 | 0.030 | 0.031 | 0.034 | 0.030 | 0.062 | 0.031 | 0.037 |
| Dielectric constant (1 mc./s.) | A | 4.1 | 4.1 | 3.9 | 4.0 | 4.1 | 3.9 | 5.4 | 4.0 | 4.3 |
| | B | 4.2 | 4.2 | 4.0 | 4.1 | 4.2 | 4.2 | 4.8 | 4.3 | 5.1 |
| Insulation resistance (m.Ω) | A | $6.4 \times 10^6$ < | $6.4 \times 10^6$ | $6.4 \times 10^6$ | $6.4 \times 10^6$ | $6.4 \times 10^6$ | $6.4 \times 10^5$ | $3.9 \times 10^5$ | $6.4 \times 10^5$ | $6.4 \times 10^5$ |
| | C | $2.5 \times 10^4$ | $3.2 \times 10^4$ | $5.3 \times 10^4$ | $6.9 \times 10^4$ | $3.2 \times 10^4$ | $5.2 \times 10^4$ | $2.4 \times 10^3$ | $3.9 \times 10^4$ | $9.0 \times 10$ |
| Water absorption (percent) | D | 0.43 | 0.35 | 0.33 | 0.30 | 0.40 | 0.35 | 1.20 | 0.40 | 1.87 |
| Workability of punching (20° C.). | Surface | 80 | 80 | 80 | 90 | 90 | 25 | 25 | 25 | 80 |
| | End surface | 80 | 70 | 80 | 80 | 90 | 0 | 25 | 50 | 80 |
| | Hole | 80 | 80 | 90 | 80 | 90 | 50 | 25 | 50 | 80 |
| Resistance to trichlene | | (¹) | (¹) | (¹) | (¹) | (¹) | (¹) | (¹) | (²) | (¹) |
| Resistance to acetone | | (¹) | (¹) | (¹) | (¹) | (¹) | (¹) | (¹) | (²) | (¹) |

¹ No change.  ² Little change.

What is claimed is:

1. A method of producing laminated plates which comprises impregnating base materials for said laminated plates with a first varnish comprising a solution in a water-containing organic solvent of a water-soluble phenol type resin obtained by reacting a phenol group compound and a formaldehyde-producing compound in the presence of an alkaline catalyst and a second varnish comprising an aromatic hydrocarbon modified phenol type resin obtained by reacting an aromatic hydrocarbon with formaldehyde to produce an aromatic hydrocarbon formaldehyde resin and reacting said resulting resin with a phenol group compound, a formaldehyde-producing compound and a vegetable oil having at least one hydrocarbon chain of 15 to 17 carbon atoms attached to the phenol nucleus, and heating and pressing a number of plates of the impregnated base materials to bond them together.

2. A method according to claim 1 wherein the water soluble phenol type resin is dissolved in a water-containing organic solvent containing more than 20 weight percent of water.

3. A method according to claim 1 wherein the vegetable oil is at least one member selected from the group consisting of cashew nut oils and urushiols.

4. A method according to claim 1 wherein the aromatic hydrocarbon modified phenol type resin is a product obtained by copolycondensation of 5 to 70 weight percent of an aromatic hydrocarbon formaldehyde resin, 20 to 80 percent of a vegetable oil and 10 to 75 weight percent of formaline, paraformaldehyde and aqueous solutions of said materials.

9. The method of claim 1, wherein the aromatic hydrocarbon formaldehyde resin is produced by subjecting at least one member selected from the group consisting of benzene, toluene, orthoxylene, methaxylene, paraxylene, mixed xylene, mesitylene, naphthalene, and alkyl-substituted aromatic hydrocarbons, and a formaldehyde group compound to copolycondensation in the presence of an acidic catalyst.

References Cited
UNITED STATES PATENTS

| | | | |
|---|---|---|---|
| 2,314,701 | 3/1943 | Harvey | 260—46 |
| 2,317,607 | 4/1943 | Harvey | 260—46 |
| 2,335,603 | 11/1943 | Novotny | 260—46 |
| 2,341,115 | 2/1944 | Novotny | 260—46 X |
| 2,563,614 | 8/1951 | Palmer | 260—46 X |
| 2,566,851 | 9/1951 | Novotny | 260—46 X |

FOREIGN PATENTS 950,623  2/1964  Great Britain.

EARL M. BERGERT, *Primary Examiner.*

C. B. COSBY, *Assistant Examiner.*

U.S. Cl. X.R.

161—259; 260—46